United States Patent [19]

Johnson et al.

[11] Patent Number: 5,068,216

[45] Date of Patent: Nov. 26, 1991

[54] PILLARING LAYERED SILICATES WITH A MIXTURE OF SWELLING AGENT AND PILLAR PRECURSOR

[75] Inventors: Ivy D. Johnson, Medford; Kenneth G. Simmons, Williamstown, both of N.J.

[73] Assignee: Mobil Oil Corp., Fairfax, Va.

[21] Appl. No.: 686,844

[22] Filed: Apr. 17, 1991

Related U.S. Application Data

[63] Continuation of Ser. No. 459,213, Dec. 29, 1989, abandoned.

[51] Int. Cl.$^5$ ............................................. B01J 21/06
[52] U.S. Cl. ............................... 502/241; 502/350; 502/84; 502/63; 502/242; 502/243; 502/246; 502/250; 502/254; 502/258; 502/263; 423/70; 423/333; 423/71; 423/331; 423/332
[58] Field of Search ............... 502/242, 350, 63, 84, 502/241, 243, 246, 250, 254, 258, 263; 423/70, 71, 331, 332, 333

[56] References Cited

U.S. PATENT DOCUMENTS

| | | | |
|---|---|---|---|
| 4,831,006 | 5/1989 | Aufdembrink | 502/242 |
| 4,859,648 | 8/1989 | Landis et al. | 502/350 |

FOREIGN PATENT DOCUMENTS

| | | | |
|---|---|---|---|
| 1251432 | 3/1989 | Canada | 502/242 |
| 8800090 | 1/1988 | PCT Int'l Appl. | 502/242 |
| 8800091 | 1/1988 | PCT Int'l Appl. | 502/63 |
| 8800092 | 1/1988 | PCT Int'l Appl. | 502/63 |

Primary Examiner—Anthony McFarlane
Assistant Examiner—Nhat Phan
Attorney, Agent, or firm—Alexander J. McKillop; Charles J. Speciale; Edward F. Kenehan, Jr.

[57] ABSTRACT

There is provided a method for pillaring a layered silicate, such as kenyaite, with polymeric oxide by using a single step treatment with a mixture of swelling agent and pillar precursor. The swelling agent may be an organic cation, such as a cetyltrimethylammonium cation, and the pillar precursor may be a compound which is capable of hydrolyzing to form a polymeric oxide. Tetraethylorthosilicate is an example of such a pillar precursor.

6 Claims, No Drawings

PILLARING LAYERED SILICATES WITH A MIXTURE OF SWELLING AGENT AND PILLAR PRECURSOR

This is a continuation of copending application Ser. No. 07/459,213, filed on Dec. 29, 1989 now abandoned.

BACKGROUND

This application relates to a method for pillaring a layered silicate, such as kenyaite, with polymeric oxide by using a mixture of swelling agent and pillar precursor.

Layered silicates such as magadiite are layered materials which have structures distinct from zeolite structures such as that of ZSM-5. Layered materials have three-dimensional structures which exhibit their strongest chemical bonding in only two dimensions. In such materials, the stronger chemical bonds are formed in two-dimensional planes and a three-dimensional solid is formed by stacking such planes on top of each other. However, the interactions between the planes are weaker than the chemical bonds holding an individual plane together. The weaker bonds generally arise from interlayer attractions such as Van der Waals forces, electrostatic interactions, and hydrogen bonding. In those situations where the layered structure has electronically neutral sheets interacting with each other solely through Van der Waals forces, a high degree of lubricity is manifested as the planes slide across each other without encountering the energy barriers that arise with strong interlayer bonding. Graphite is an example of such a material. The silicate layers of a number of clay materials are held together by electrostatic attraction mediated by ions located between the layers. In addition, hydrogen bonding interactions can occur directly between complementary sites on adjacent layers, or can be mediated by interlamellar bridging molecules.

U.S. Pat. No. 4,859,648, the entire disclosure of which is expressly incorporated herein by reference, points out that layered oxide materials including layered silicates, such as magadiite and kenyaite, may be intercalated with polymer oxides to provide catalysts suitable for various hydrocarbon conversions.

SUMMARY

According to an aspect of this invention, there is provided a method for preparing a layered silicate material containing interspathic polymeric oxide of at least one element selected from Groups IB, IIB, IIIA, IIIB, IVA, IVB, VA, VB, VIA, VIIA, and VIIIA of the Periodic Table, said method comprising the steps of:

(i) forming a mixture of a swelling agent and a pillar precursor, said swelling agent being an organic compound which is a cationic species or capable of forming a cationic species, and said pillar precursor being capable of conversion to said interspathic polymeric oxide;

(ii) contacting a layered silicate, which contains ion exchange sites having interspathic cations associated therewith, with said mixture of step (i), whereby said organic compound is exchanged with said interspathic cations, and whereby said pillar precursor is provided between the layers of said layered silicate; and (iii) converting said pillar precursor to interspathic polymeric oxide.

It will be understood that the terms, magadiite and kenyaite, as used herein, connote synthetic forms of the naturally occurring substances of the same structure. For example, naturally occurring magadiite has been found in Lake Magadi, Kenya.

EMBODIMENTS

Layered silicates are composed of tetrahedral sheets condensed on each other and lack the octahedral sheets found in clays. Layered silicates are "non-swellable" which is intended to distinguish from conventional clays which contain octahedrally coordinated metal oxide sheets bonded to tetrahedrally coordinated silica sheets and which undergo substantial swelling, sometimes by an essentially unbounded amount, when contacted with water. As used herein in relation to a layered silicate material, the term "non-swellable" is defined as meaning a layered silicate material, which, when contacted with at least 10 grams of water per gram of the layered silicate at 23° C. for 24 hours, exhibits an increase in d-spacing no greater than 5A as compared with the material before treatment. Included among these materials are the metasilicates. Layered silicates, e.g., high silica alkali silicates such as magadiite, natrosilite, kenyaite, makatite, nekoite, kanemite, okenite, dehayelite, macdonaldite and rhodesite, unlike swellable clays, lack octahedral sheets, i.e., sheets composed of atoms which are octahedrally coordinated with oxygen atoms.

The layered silicates known as high silica alkali silicates whose layers lack octahedral sheets can be prepared hydrothermally from an aqueous reaction mixture containing silica and caustic at relatively moderate temperatures and pressures. These layered silicates may contain tetracoordinate framework atoms other than Si. Such layered silicates can be prepared by co-crystallizing in the presence of non-silicon tetravalent elements, e.g., those selected from the group consisting of Al, B, Cr, Fe, Ga, In, Zr as well as any other such elements which are catalytically useful when incorporated in the silicate structure. Alternatively, non-silicon framework elements already in a layered silicate may be substituted by a tetracoordinate element. For example, kenyaite containing boron in its framework when treated with aluminum nitrate results in a kenyaite which contains aluminum in its framework. Both co-crystallized and substituted layered high silica alkali silicates may be prepared by methods described herein.

Synthetic magadiite is readily synthesized hydrothermally from a reaction mixture containing inexpensive sources of silica and caustic. Tetracoordinate elements other than silicon, e.g., those selected from the group consisting of Al, B, Cr, Fe, Ga, In, Ni, Zr and other catalytically useful metals, may be added to the reaction mixture to produce synthetic magadiite layered silicates. Preferably, such elements are selected from the group consisting of Al and Fe. An organic directing agent may also be added to the reaction mixture. The reaction mixture for synthetic magadiite materials can be described in molar ratios as follows:

$SiO_2/X_2O_3 = 10$ to infinity where X can be Al, B, Cr, Fe, Ga, and/or Ni or other catalytically useful metal $M^+OH^-/SiO_2 = 0$ to 0.6 (preferably 0.1–0.6)
  M=any alkali metal $H_2O/SiO_2 = 8$–500

$R/SiO_2 = 0$–0.4 where R can be an organic such as benzyltriethylammonium chloride, benzyltrimethylammonium chloride, dibenzylmethylammonium chloride, N,N'-dimethylpiperazine, triethylamine, or other quaternary compounds or heterocyclic amines.

The reaction mixture can be maintained at a temperature of about 100° to 200° C. for anywhere from about 1 to 150 days in order to form a product having the following composition:

% N=0–3, e.g., 0 to 0.3
$SiO_2/X_2O_3$ = 10 to infinity where X may be in the tetrahedral or octahedral position
$M_2O/SiO_2$=0 to 0.5, e.g., 0.05–0.1

Kenyaite, a layered silicic acid which is known to exist in nature as a sodium salt $Na_2Si_{22}O_{45}H_2O$ can be prepared in the potassium form $K_2Si_{22}O_{45}$ $10H_2O$ in the laboratory. Synthetic kenyaite is readily synthesized hydrothermally from a reaction mixture containing inexpensive sources of silica and caustic, preferably KOH. Tetracoordinate elements other than silicon, e.g., those selected from the group consisting of Al, B, Cr, Fe, Ga, In, Ni, Zr and other catalytically useful metals, may be added to the reaction mixture to produce synthetic kenyaite. Al $(NO_3)_3$. $9H_2O$ and aluminum-tri-sec-butoxide are suitable reagents for the introduction of non-silicon tetracoordinate elements in the kenyaite framework. Co-crystallizing with B, Al, and/or Zr is particularly preferred. The reaction mixture may also be seeded with kenyaite.

Organic compounds which may be used to swell layered silicates are disclosed in the aforementioned U.S. Pat. No. 4,859,648. More particularly, the layered silicate may be swelled with an organic compound capable of forming cationic species such as organophosphonium or organoammonium ion. Insertion of the organic cation between the adjoining layers serves to physically separate the layers in such a way as to make the layered silicate receptive to the interlayer addition of a hydrolyzable, polymeric oxide precursor. In particular, alkylammonium cations have been found useful in the present invention. Thus $C_3$ and larger alkylammonium, e.g., n-octylammonium, cations are readily incorporated within the interlayer species of the layered silicates, serving to prop open the layers in such a way as to allow incorporation of the polymeric oxide precursor. The extent of the interlayer spacing can be controlled by the size of the organoammonium ion employed so that use of the n-propylammonium cation can achieve a d-spacing of about 2 to 5A or an opening of about 2–3A, whereas to achieve an interlayer opening of 10 to 20A an n-octylammonium cation or a cation of equivalent length is required. The interlayer spacing obtained by each cation can also vary depending on the layered silicate being treated. Indeed, the size and shape of the organic cation can affect whether or not it can be incorporated within the layered silicate structure at all. Ammonium cations derived from n-alkyl primary amines, such as primary monoamines, are particular examples of cations which may be used in the present method. The organic ammonium cations separating the silicate layers may also be formed in situ by reaction of the neutral amine species with interlayer hydrogen or hydronium cations of the layered silicate starting material. Alternatively, where the interlayer cations of the layered silicate starting material are alkali metal cations, the organic ammonium cation may be formed by initially combining an amine and an aqueous acid solution, such as hydrochloric acid, and then treating the layered silicate with the resulting aqueous organoammonium ion solution. In either case, the treatment can be conducted in aqueous media so that water is then available to hydrolyze the hydrolyzable polymeric oxide precursor introduced into the "propped" product. Under hydrolysis, the oxide precursor forms a thermally stable polymeric oxide. A final calcination step may be employed which is severe enough to remove a substantial amount of the organic interspathic species. Any remaining organic can be removed by a separate chemical treatment.

Pillar precursors which may be used to pillar the layered silicates are also disclosed in the aforementioned U.S. Pat. No. 4,859,648. More particularly, the polymeric oxide pillars are formed from a precursor material which is preferably introduced between the layers of the organic "propped" species as a cationic, or more preferably, electrically neutral, hydrolyzable compound of the desired elements. The precursor material is preferably an organometallic compound which is a liquid under ambient conditions. In particular, hydrolyzable compounds, e.g., alkoxides, of the desired elements of the pillars are utilized as the precursors. Suitable polymeric silica precursor materials include tetraalkylsilicates, e.g., tetrapropylorthosilicate, tetramethylorthosilicate and, most preferably, tetraethylorthosilicate. Where the pillars are also required to include polymeric alumina, a hydrolyzable aluminum compound can be contacted with the organic "propped" species before, after or simultaneously with the contacting of the layered silicate with the silicon compound. Preferably, the hydrolyzable aluminum compound employed is an aluminum alkoxide, e.g., aluminum isopropoxide. If the pillars are to include polymeric titania, a hydrolzable titanium compound such as titanium alkoxide, e.g., titanium isopropoxide, may be used.

EXAMPLES 1 AND 2

Tetraethylorthosilicate (TEOS, 4 g) was added to a cetyltrimethylammonium chloride solution (20 g, ARQUAD Quaternary Ammonium Chloride from Akzo Chemical Company-25% by weight in an aqueous suspension) and stirred 1 hour. To this solution, as-synthesized kenyaite wet-cake (4 g, 25% solids) was added. The slurry was stirred for 16 hours, filtered, and air-dried. Approximately one half of the dried powder was calcined at 540° C. for 6 hours (Example 1). The other half was suspended in water (10 cc/g solids), stirred for 2 hours, filtered, air-dried and then calcined at 540° C. for 6 hours (Example 2). The properties of the pillared products are listed below:

|  | Example 1 | Example 2 |
|---|---|---|
| K, ppm | NA | 580 |
| Ash, wt % | NA | 96.1 |
| Surface area, m$^2$/g | 94 | 729 |
| Calculated Interlayer Distance (A) | Not Observed | 19.7 |

EXAMPLES 3 THROUGH 5

Several samples were prepared with varied dilutions of the quaternary salt solution. The procedure is described below and the amounts of reagents used are listed in Table 1.

Tetraethylorthosilicate was added to a cetyltrimethylammonium chloride solution (ARQUAD Quaternary Ammonium Chloride from Akzo Chemical Company-25% by weight in an aqueous suspension) and stirred 1 hour. To this solution, as-synthesized kenyaite wet-cake was added. The slurry was stirred for 16 hrs, filtered, and air-dried. The powder was suspended in water (10 cc/g solids), stirred for 2 hours, filtered, air-dried and then calcined at 540° C. for 6 hours. The properties of the pillared products are listed in Table 2.

EXAMPLE 6

A procedure similar to that described in Examples 3 through 5 was repeated only trimethylborate was added to the TEOS prior to addition to the cetyltrimethylammonium (hereinafter referred to as the cetylammonium) solution. The composition of the pillaring solution is given in Table 1. The properties of the pillared products are listed in Table 2.

EXAMPLE 7

A procedure similar to that described in Examples 3 through 5 was repeated only aluminum tri-sec-butoxide was added to the TEOS prior to addition to the cetylammonium solution. The composition of the pillaring solution is given in Table 1. The properties of the pillaring solution is given in Table 1. The properties of the pillared products are listed in Table 2.

EXAMPLE 8

A procedure similar to that described in Examples 3 through 5 was repeated only $Al(NO_3)_3$ was added to the cetylammonium solution prior to the addition of the TEOS. The composition of the pillaring solution is given in Table 1. The properties of the pillared products are listed in Table 2.

EXAMPLE 9

A procedure similar to that described in Examples 3 through 5 was repeated only sodium aluminate was added to the cetylammonium solution prior to the addition of the TEOS. The composition of the pillaring solution is given in Table 1. The properties of the pillared products are listed in Table 2.

The following Comparative Examples are included for comparison.

COMPARATIVE EXAMPLE A

A procedure similar to that described in Examples 3 through 5 was repeated only no kenyaite was added. This procedure was to examine the properties of the silica gel formed from the cetylammonium/TEOS solution. The composition of the solution is listed in Table 1. The product properties are given in Table 2.

COMPARATIVE EXAMPLE B

Kenyaite (40 g) was acid exchanged at pH 2 for 24 hours. The material was then added to a mixture of octylamine (40 g) and water (80 g) and reacted for 24 hours at room temperature. The material was filtered, air-dried then resuspended in tetraethylorthosilicate for 24 hours at room temperature. This material was filtered, air-dried and calcined at 1000° F. The product properties are given in Table 2.

TABLE 1

| | Composition of Pillaring Solutions | | | | | | | |
|---|---|---|---|---|---|---|---|---|
| | Example or Comparative Example | | | | | | | |
| | 3 | 4 | 5 | 6 | 7 | 8 | 9 | A |
| TEOS, g | 50 | 50 | 50 | 45 | 45 | 45 | 45 | 50 |
| Cetylammonium salt solution | 100 | 50 | 200 | 100 | 100 | 100 | 100 | 200 |
| $H_2O$ added to salt solution | 100 | 150 | 0 | 100 | 100 | 100 | 100 | 0 |
| As-synthesized Kenyaite (25% by weight solids) | 50 | 50 | 50 | 50 | 100 | 100 | 100 | 0 |
| $B(OCH_3)$ | — | — | — | 5 | — | — | — | — |
| Al-t-s-butoixde | — | — | — | — | 5 | — | — | — |
| $Al(NO_3)_3$ | — | — | — | — | — | 10 | — | — |
| $NaAlO_2$ | — | — | — | — | — | — | 5 | — |

TABLE 2

| | Properties of Pillared Silicates | | | | | | | | |
|---|---|---|---|---|---|---|---|---|---|
| | Example or Comparative Example | | | | | | | | |
| | 3 | 4 | 5 | 6 | 7 | 8 | 9 | A | B |
| $SiO_2$ | 95.9 | 96.0 | 95.5 | 93.7 | NA | NA | 91.7 | NA | NA |
| K, ppm | 960 | 805 | 2200 | 2200 | NA | NA | 3200 | NA | NA |
| NA | | | | | | | | | |
| Ash, wt % | 98.26 | 98.38 | 98.17 | 97.10 | NA | NA | 97.58 | NA | NA |
| $Al_2O_3$, wt % | | | | | | NA | 1.3 | NA | NA |
| B, wt % | | | | 0.63 | | | | | |
| Calculated Interlayer Distance (A) | 26 | 26 | 23 | 27 | N0 | N0 | 20 | | 18.2 |
| Surface area, $m^2/g$ | 734 | 766 | 711 | 624 | 292 | 591 | 685 | 293 | 596 |
| Adsorption, wt % | | | | | | | | | |
| $H_2O$ | 11.1 | 15.1 | 15.0 | 6.4 | NA | NA | 13.2 | 6.9 | 17.5 |
| Cyc-6 | 27.5 | 28.3 | 27.3 | 26.3 | NA | NA | 28.8 | 9.5 | 20.9 |
| n-Hex | 21.1 | 21.6 | 20.1 | 19.4 | NA | NA | 22.8 | 8.3 | 17.8 |

NA — Not available
N0 — No low-angle x-ray diffraction line observed

What is claimed is:

1. A method for preparing a layered silicate material containing interspathic polymeric oxide of at least one element selected from Groups IB, IIB, IIIA, IIIB, IVA, IVB, VA, VB, VIA, VIIA, and VIIIA of the Periodic Table, said method comprising the steps of:

(i) forming an aqueous solution of a swelling agent and a pillar precursor, said swelling agent being an organic compound which is a cationic species or capable of forming a cationic species, and said pillar precursor being capable of conversion by hydrolysis to form said interspathic polymeric oxide;

(ii) contacting a layered silicate, which contains ion exchange sites having interspathic cations associated therewith, with said mixture of step (i), whereby said organic compound is exchanged with said interspathic cations, and whereby said pillar precursor is provided between the layers of said layered silicate; and (iii) converting said pillar precursor to interspathic polymeric oxide.

2. A method according to claim 1, wherein said swelling agent is a cetyltrimethylammonium cation.

3. A method according to claim 1, wherein said pillar precursor is tetraethylorthosilicate.

4. A method according to claim 1, wherein said layered silicate is contacted, in accordance with step (ii), with an aqueous solution containing cetyltrimethylammonium cations and tetraethylorthosilicate.

5. A method according to claim 4, wherein said layered silicate is kenyaite.

6. A method according to claim 1, wherein said aqueous solution of step (i) is formed by adding tetraethylorthosilicate to an aqueous solution of a cetyltrimethylammonium compound.

* * * * *